(12) United States Patent
Williams

(10) Patent No.: US 10,107,323 B2
(45) Date of Patent: Oct. 23, 2018

(54) BARREL NUT ASSEMBLY

(71) Applicant: Marty Williams, Colorado Springs, CO (US)

(72) Inventor: Marty Williams, Colorado Springs, CO (US)

( * ) Notice: Subject to any disclaimer, the term of this patent is extended or adjusted under 35 U.S.C. 154(b) by 205 days.

(21) Appl. No.: 14/492,473

(22) Filed: Sep. 22, 2014

(65) Prior Publication Data

US 2015/0010371 A1 Jan. 8, 2015

Related U.S. Application Data

(63) Continuation of application No. 12/122,546, filed on May 16, 2008, now Pat. No. 8,858,141.

(51) Int. Cl.
| | | |
|---|---|---|
| *F16B 37/04* | (2006.01) | |
| *F16B 39/282* | (2006.01) | |
| *F16B 7/18* | (2006.01) | |
| *F16B 21/18* | (2006.01) | |
| *F16B 43/00* | (2006.01) | |

(52) U.S. Cl.
CPC .............. *F16B 37/047* (2013.01); *F16B 7/18* (2013.01); *F16B 39/2825* (2013.01); *F16B 21/18* (2013.01); *F16B 43/005* (2013.01); *Y10T 403/18* (2015.01)

(58) Field of Classification Search
CPC ......... F16B 7/0453; F16B 7/18; F16B 37/047
USPC ....................................................... 411/104
See application file for complete search history.

(56) References Cited

U.S. PATENT DOCUMENTS

| | | | | |
|---|---|---|---|---|
| 2,611,633 | A * | 9/1952 | Webster .................. | E06B 3/726 256/65.08 |
| 3,233,501 | A * | 2/1966 | Van Buren, Jr. .......... | F16B 7/18 411/104 |
| 3,332,374 | A * | 7/1967 | Ferdinand .............. | A47B 57/44 108/107 |
| 4,068,958 | A * | 1/1978 | Beckershoff .......... | F16B 37/047 403/384 |
| 4,139,314 | A * | 2/1979 | Albern .................... | F16B 12/14 403/14 |
| 4,261,266 | A * | 4/1981 | Hedinger ................. | A47B 1/03 108/69 |

(Continued)

FOREIGN PATENT DOCUMENTS

| | | |
|---|---|---|
| EP | 0 997 587 A1 * | 5/2000 |
| EP | 2 985 500 A1 * | 2/2016 |

(Continued)

*Primary Examiner* — Flemming Saether
(74) *Attorney, Agent, or Firm* — Lynette Wylie; Apex Juris, pllc.

(57) ABSTRACT

A fastener assembly for securing two components to one another. The fastener assembly includes a barrel or pin that has a radially extending hole in the barrel. The pin also has a reduced diametrical portion on at least one end to form a shoulder and possibly on both ends. The pin is inserted into a hole formed into a hollow or sandwich component. The shoulder engages against a wall on the component to orient and secure the pin in the hole. A threaded fastener is then inserted transversely through the two components to engage in the radially extending hole. The threaded fastener is then rotated to secure the two components to one another.

6 Claims, 7 Drawing Sheets

(56) References Cited

U.S. PATENT DOCUMENTS

| | | | | |
|---|---|---|---|---|
| 4,861,207 A * | 8/1989 | Do | ........................ | F16B 37/047 411/104 |
| 4,886,407 A * | 12/1989 | Harbin | .................. | F16B 37/047 411/104 |
| 5,500,963 A * | 3/1996 | Yeh | ...................... | A47C 19/005 403/231 |
| 5,545,231 A * | 8/1996 | Houser | ..................... | A61F 2/76 623/38 |
| 5,685,679 A * | 11/1997 | Sugiura | ................ | H01H 85/205 337/263 |
| 6,612,772 B1 * | 9/2003 | DeMarco | .................. | F16B 7/18 403/256 |
| 7,448,820 B1 * | 11/2008 | Faber | ..................... | F16B 7/0453 256/65.08 |
| 2015/0354616 A1 * | 12/2015 | Dimelow | ................ | F16B 31/00 411/5 |

FOREIGN PATENT DOCUMENTS

FR        1 386 323 A  *   1/1965
FR        2 599 097 A1 *   11/1987

\* cited by examiner

US 10,107,323 B2

BARREL NUT ASSEMBLY

CROSS-REFERENCE TO RELATED APPLICATION

This application is a continuation of U.S. Nonprovisional patent application Ser. No. 12/122,546 filed on May 16, 2008, which is incorporated by reference herein.

FIELD OF THE INVENTION

This invention relates to the field of fasteners and particularly to the field of barrel nut assemblies.

BACKGROUND OF THE INVENTION

This often becomes necessary to secure two abutting components together with fasteners. These can be a problem if the fasteners are not able to extend the full width of the components, such as in a panel, post or other larger member. Another problem occurs when one of the components is hollow such as in a tube, a sandwich panel, composite material or when the material of the component is not sufficiently strong to engage and hold a fastener.

One type of fastener that has been used in the past is a barrel nut fastener. barrel nut fasteners have been widely used in several industries, including, for example, aeronautics, construction and furniture, utilizing applications where a first component, such as a panel, is to be fastened to another component. Barrel nut fasteners typically have two components, a cylindrical pin with a radial tapped hole and an elongated bolt that is received in the radial tapped hole. The cylindrical pin is inserted in a transverse hole in the panel with the radial tapped hole is aligned with a through hole in the first component. The bolt is inserted through the second component and into the through hole until it engages in the radial tapped hole. The bolt is then rotated to fasten the first component and second component to one another.

One of the problems associated with the previous barrel nut fasteners is the alignment of the cylindrical pin in the transverse hole. The pin tends to slide transversely or rotate within the hole. This can be frustrating and increase the assembly time.

SUMMARY OF THE INVENTION

The present invention solves these and other problems by providing a fastening system that allows two components to be fastened to one another even if one or both of the components has a hollow portion. The present invention enables the fasteners to be aligned and oriented relative to one another.

The present invention, in a preferred embodiment provides a pin that can be inserted into a hole formed into a hollow portion of one of the components. The pin has a radially extending threaded portion that will engage with a threaded fastener. The pin also has diametrically reduced end portions so that shoulders are formed on each end of the pin. These shoulders engage with the side walls of the hollow portion of the component to align and secure the pin in the correct position. The threaded fastener is then inserted through the other component and into the hollow portion until it engages with the radially extending threaded portion of the pin. The threaded fastener is then rotated to draw the pin towards the other component so that the components are securely fastened.

The pin, in another preferred embodiment, includes a slot on one end of the pin. This allows the blade of a tool to be inserted into the slot and rotate the pin until the radially threaded hole is properly aligned with the threaded fastener.

The pin, in another preferred embodiment has only one reduced portion on one end of the pin to form only one shoulder. This end is inserted in the hole of the hollow component until that shoulder engages against the wall of the component to align and secure the pin. This embodiment is particularly useful when the width of the pin is greater than the width of the component.

Another preferred embodiment of the present invention has notches formed on one or both ends of the pin rather than the circumferential indentations. The notches then engage in the sidewalls of the component.

These and other features of the present invention will be evident from the ensuing detailed descriptions of preferred embodiments and drawings thereof.

DETAILED DESCRIPTION OF PREFERRED EMBODIMENTS

The present invention, in a preferred embodiment, provides an improved barrel nut fastener assembly. A preferred embodiment of the present invention is described below. It is to be expressly understood that this descriptive embodiment is provided for explanatory purposes only, and is not meant to unduly limit the scope of the present invention as set forth in the claims. Other embodiments of the present invention are considered to be within the scope of the claimed inventions, including not only those embodiments that would be within the scope of one skilled in the art, but also as encompassed in technology developed in the future.

A preferred embodiment of a barrel nut fastener of the present invention is illustrated in FIGS. 1-10. This preferred embodiment is described for use with tube members but it is to be expressly understood that the preferred embodiment can be used to fasten any other types of components.

Figure 1:
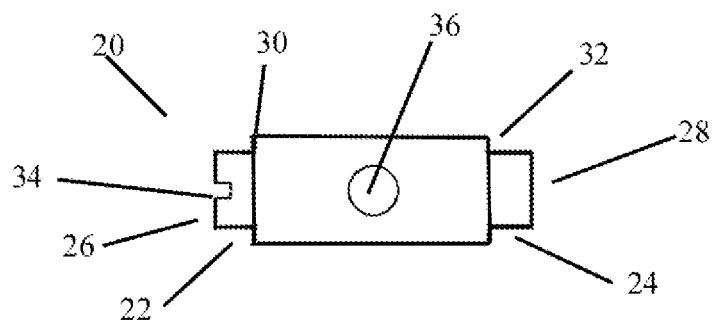
FIG. 1 is a side view of the pin of a preferred embodiment of the fastener assembly of the present invention.
Figure 2:
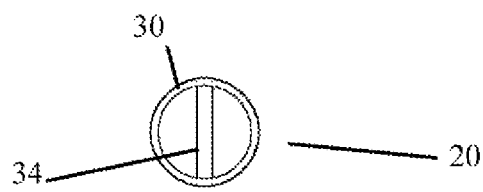
FIG. 2 is an end view of the pin of FIG. 1.
Figure 3:
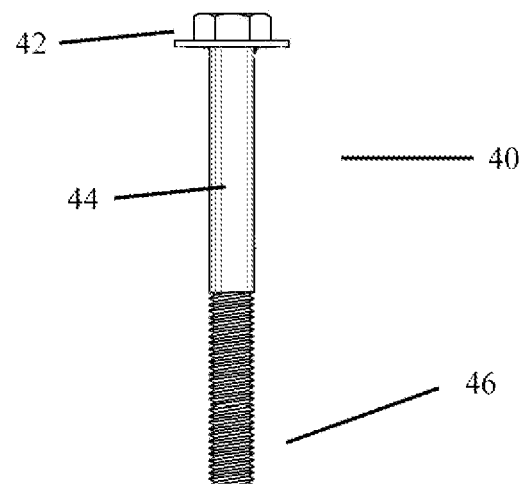
FIG. 3 is a front view of the threaded fastener of a preferred embodiment of the present invention.

Barrel nut fastener assembly 10 is shown in FIGS. 1-3. The barrel nut fastener assembly includes cylindrical pin 20 and bolt 40. The cylindrical pin 20 includes reduced diametrical portions 22, 24 on each end 26, 28 of the cylindrical pin. The reduced diametrical portions 22, 24 form shoulders 30, 32 on the pin.

While this preferred embodiment describes a cylindrical pin, the pin can be any desired geometrical shape. A cylindrical pin is preferred since the pin will be inserted into a hole which is normally cylindrical as well, but other shapes may be used as well. The end portion 26 of the cylindrical pin includes a transverse slot 34 for receiving the blade of a screwdriver. Other shapes of slots can be used as well such as for receiving a Phillips screwdriver blade, an allen wrench, or any other type of bit or tool. Preferably the slot 34 is in alignment with radial whole 36 discussed below. In an alternative embodiment, the cylindrical pin 20 does not include the slot on the end of the pin.

Radial hole 36 is formed in a center of the cylindrical pin 20. This hole is tapped to form threads 38 that will receive the bolt 40 as described in greater detail. The bolt 40 is a standard bolt having a head portion 42, shank portion 44 and threaded portion 46. Any type of bolt, screw or threaded fastener can be used in lieu of the descriptive bolt illustrated in FIG. 3.

Figure 4:
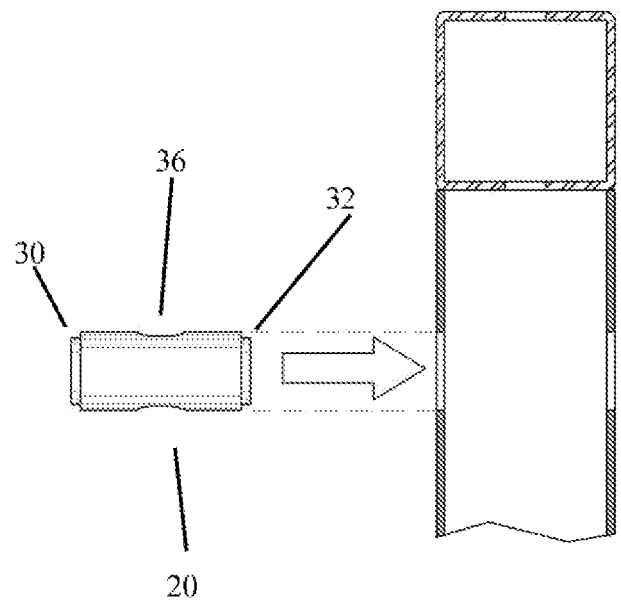
FIG. 4 is a side cross-sectional view of the pin of FIG. 1 being inserted into a hollow tube.
Figure 5:
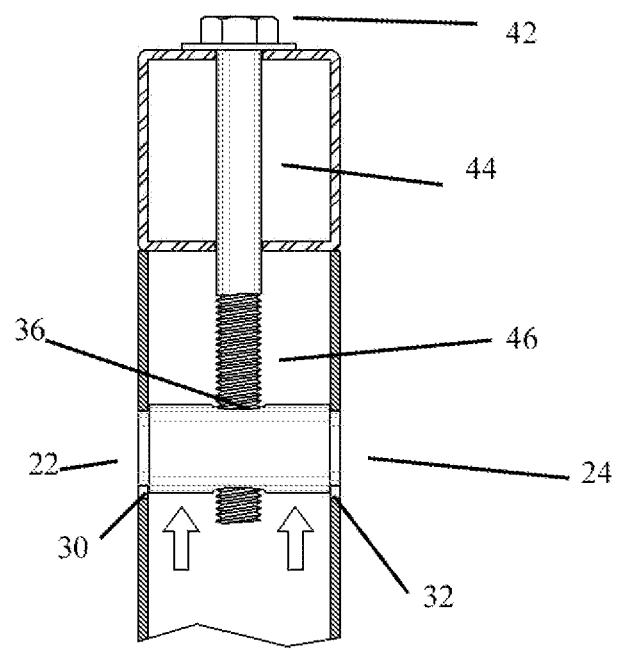
FIG. 5 is a cross-sectional view of the pin and threaded fastener of the embodiment of FIG. 1 securing two components together.
Figure 6:
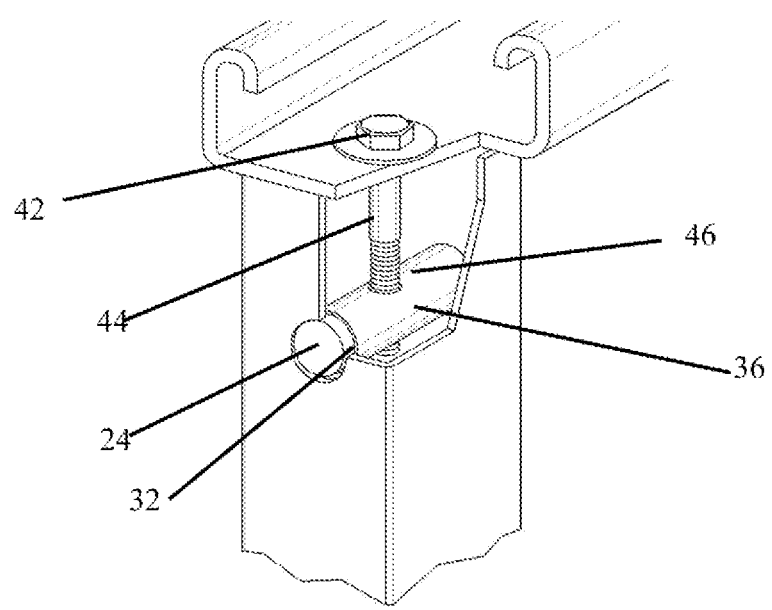
FIG. 6 is a perspective cutaway view of the fastener assembly of the embodiment of FIG. 1 securing two components to one another.
Figure 7:
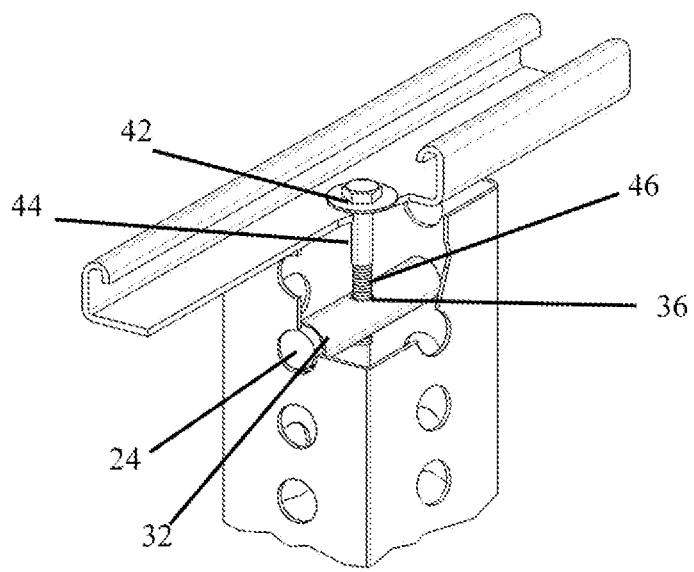
FIG. 7 is another perspective cutaway view of the fastener assembly securing two other components together.

The barrel nut assembly 10 is used to secure two parts together, such as a rail 50 and post or panel 60 as shown in FIG. 4. The pin 20 is inserted into a transverse hole 62 in the posts 60 as illustrated by the arrow in FIG. 4. The transverse hole 62 has a diameter larger than the outer diameter of the pin 20. The length of the pin 20 is approximately the length of the transverse hole. If the post 60 is solid, then the pin can be shorter than the width of the post. The shoulders 28, 30 formed on the pin will engage against the walls of the hollow post as shown in FIG. 5. This initially helps to align the pin so that the radial hole 36 is properly aligned.

The bolt 40 is inserted into a radially extending hole 52 that extends through the first component 50 and into the second component 60 until it engages in the radial hole 36 of the pin. The pin 20 can be rotated by a screwdriver or tool engaging in slot 34 until the radial hole 36 is aligned with the bolt 40. Since the slot 34 is aligned with the radial hole 36, it will be easy to determine the correct orientation. Once the bolt 40 and radial whole 36 are properly aligned, the bolt can be rotated so the threads of the bolt engage with the threads of the pin to draw the pin towards the head of the bolt as shown in FIG. 5. This will tighten and secure the rail 50 against the post 60.

As the pin 20 is moved towards the head of the bolt 40 during the tightening process, the shoulders 28, 30 on the pin 20 engage against the sides of the whole 52. This provides a more secure engagement and also keeps the pin 20 properly aligned. The pin 20 will be unable to be accidentally dislodged or moved out of alignment. The barrel nut fastener assembly of this preferred embodiment in use is shown in different views in FIGS. 6 and 7.

Figure 8:
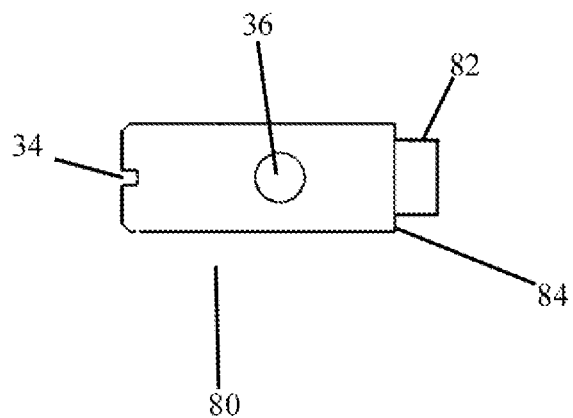
FIG. 8 is a side view of another embodiment of the pin of the present invention.

Another preferred embodiment of the present invention is illustrated in FIG. 8. This pin 80 of this preferred embodiment has a reduced portion 82 on only end of the pin 80 that forms a shoulder 84. This pin is used in a similar manner as the earlier described pin except the shoulder 84 only engages on one wall. The pin of this embodiment will slightly cock as the bolt is tightened against the pin but will prevent accidental dislodgement.

Figure 9:
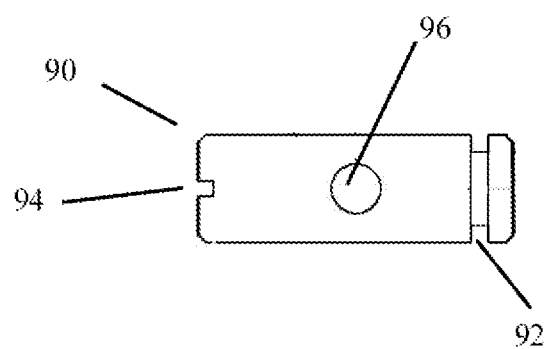
FIG. 9 is a side view of another embodiment of the pin of the present invention.
Figure 10:
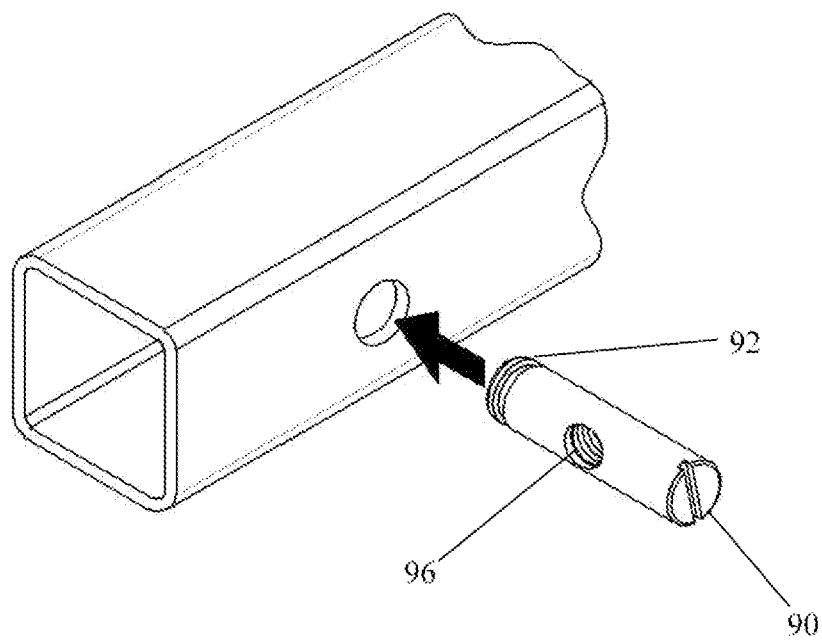
FIG. 10 is a perspective view illustrating the pin of FIG. 9 inserted into a hollow component.
Figure 11:
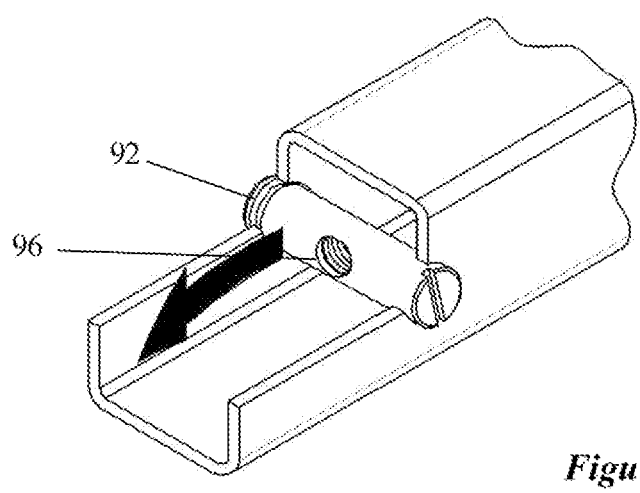
FIG. 11 is a perspective cutaway view illustrating the pin of FIG. 9 inserted into a hollow component.

Another preferred embodiment is illustrated in FIGS. 9, 10 and 11. The pin 90 of this preferred embodiment includes a circumferential notch 92 formed near one end of the pin. The pin also includes a slotted end 94 and a radially extending threaded hole 96. It is used in a manner similar to the earlier described embodiments. Once the pin is inserted into the transverse hole of a hollow tube or other component, the notch 92 engages the wall of the tube to secure the pin and align the pin. The bolt then pulls the pin so that the notch will engage against the wall and prevent accidental dislodgement or misalignment of the pin. Also, not only is the pin nut locked in the tube, the engagement of the slot in the side of the tubing puts pressure on the threads of the bolt to prevent the bolt from loosening due to vibration.

Figure 12:
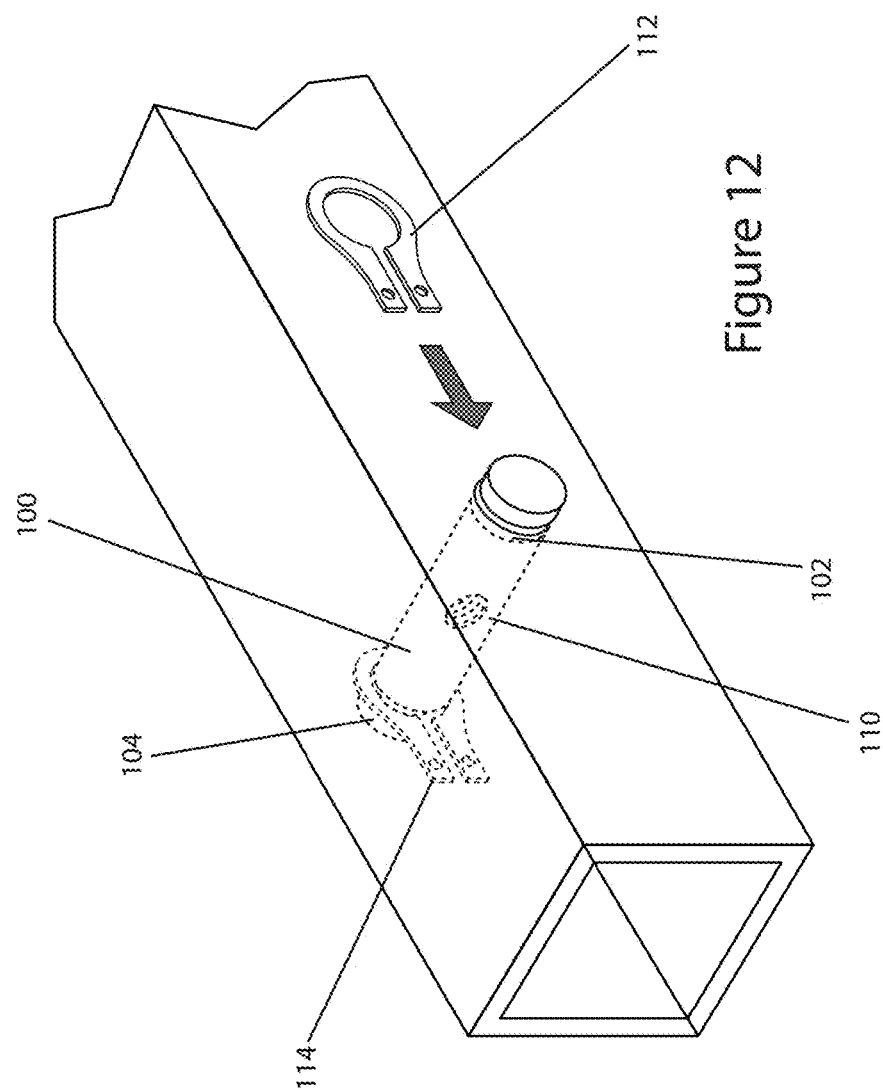
FIG. 12 is a perspective cutaway view illustrating the pin with dual slots and clips securing the pin in the component, with one clip on the backside already in place and a clip on the front side prior to positioning.
Figure 13:
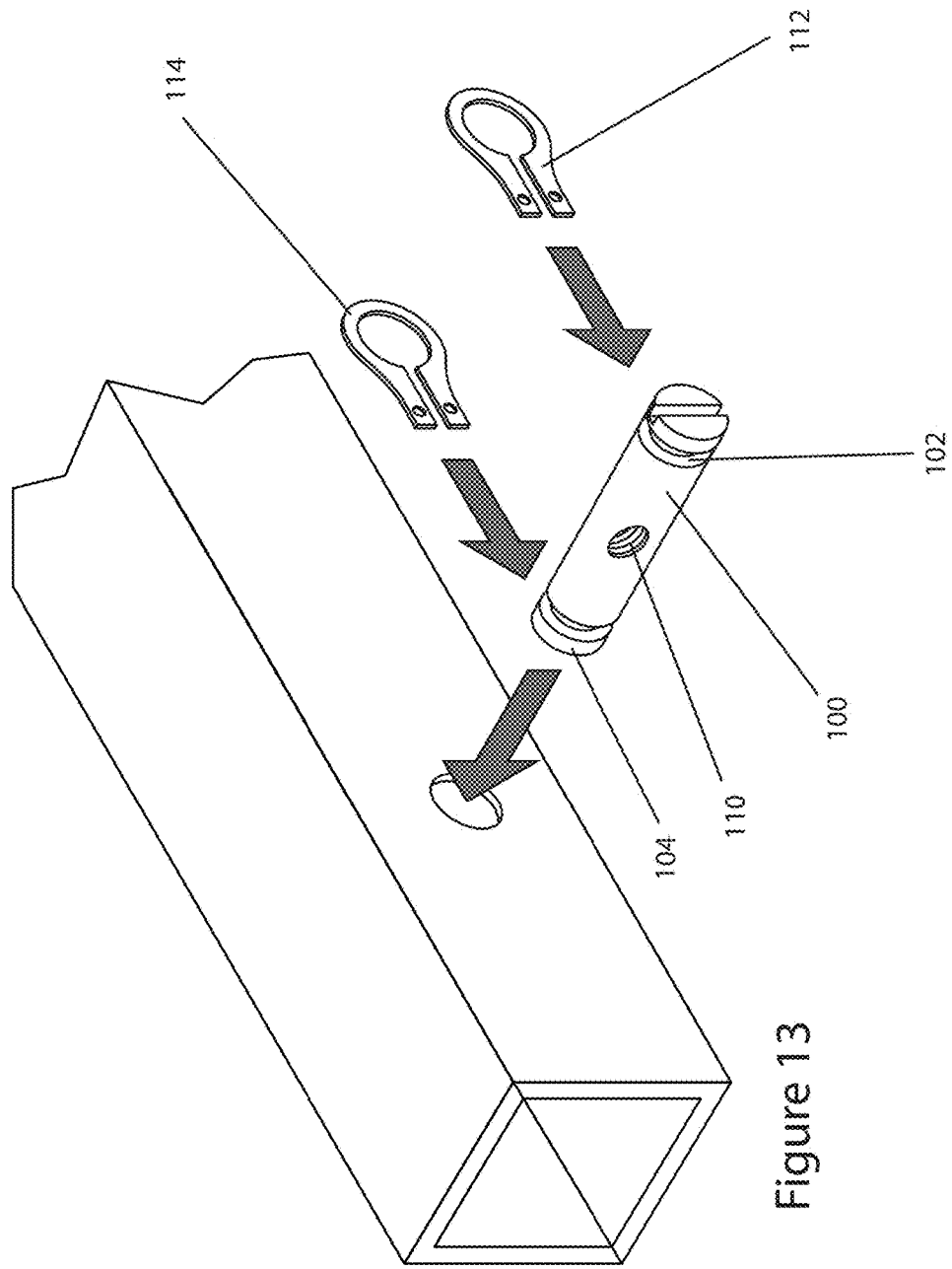
FIG. 13 is a perspective view illustrating the pin with dual slots and clips prior to pin insertion and clip securement.

Another preferred embodiment is illustrated in FIG. 12. The pin nut 100 includes two circumferential slots 102, 104 formed near each end of the pin respectively along with the radially extending threaded hole 110. Clips 112, 114 are engaged in the slots 102, 104, respectively, once the pin 100 is inserted in the tubing hole. The clips 112, 114 prevent the pin from sliding out of the tubing accidentally.

The present invention has widespread applications, particularly for hollow tubing, hollow or composite panels, or any other application where two components are to be fastened to one another. In particular, the present invention has utility for fastening components where the fasteners are not able to extend fully through both components or one of the components is hollow or not able to structurally secure a fastener.

One example of the application of the present invention is found in U.S. patent application Ser. No. 11/767,166 assigned to the assignee of the present application. In this application, a receiver mounted cargo carrier is formed from hollow tubing. The hollow tubing, as shown in FIGS. 6-12 of that application are assembled to one another by the fastening systems of the present invention. This provides a carrier that is able to be shipped in a knock downed configuration, easily assembled with common tools and securely fastened so that it can carry relatively heavy cargo. Other applications include crates, trailers, and any other application that requires fastening systems for hollow or other types of components.

These and other embodiments of the present invention are considered to be within the scope of the invention as claimed.

What is claimed is:

1. A fastener assembly for securing a first component and a second component to one another, wherein said fastener assembly comprises:
   a pin for insertion through a first hole in a wall of said first component and through a second hole in a second wall of said first component wherein said first hole and said second hole are in longitudinal alignment for receiving said pin, and wherein said pin has a first end and a second end and where both said first end and said second end of said pin extend beyond said walls of said first component;
   a first circumferential channel positioned near said first end of said pin and beyond said wall of said first component;
   a second circumferential channel positioned near said second end of said pin and beyond said second wall of said first component;
   a radially extending threaded hole between said first circumferential channel and said second circumferential channel in said pin, for engagement by a corresponding threaded fastener for insertion through a corresponding hole in said second component such that threadening said fastener in tightened engagement with said second component matingly couples and fastens said first component to said second component; and a first clip attachable to said first circumferential channel of said pin and a second clip attachable to said second circumferential channel of said pin where said first and said second clips are located beyond said walls of said first component, thereby retaining said pin within said holes.

2. The fastener pin of claim 1, further comprising at least one groove on at least one end of said pin.

3. A fastener pin assembly for securing a first component and a second component to one another, comprising:

a pin having an elongated cylindrical configuration having a first end and a second end and at least one circumferential channel near an end of said pin;

said first component having at least two opposing walls with a first hole in a first wall and a second hole in a second wall; where said pin is inserted through said first hole and said second hole and where said at least one circumferential channel is located outside of one of said first or second walls;

a threaded hole radially extending through said pin for engagement by a corresponding threaded fastener for insertion through a corresponding hole in said second component such that threadening said fastener in tightened engagement with said threaded hole matingly couples said first component to said second component; and at least one clip attachable to said at least one circumferential channel of said pin where said at least one clip is located outside said one of said first or second walls.

4. The fastener pin assembly of claim 3, further comprising a second circumferential channel near said second end of said pin.

5. The fastener pin assembly of claim 4, further comprising a second clip attachable to said second circumferential channel on said second end of said pin and where both clips are located outside said walls.

6. The fastener pin of claim 3, further comprising at least one groove on at least one end of said pin.

* * * * *